United States Patent

[11] 3,625,870

| [72] | Inventor | Amos Norwood |
| | | Philadelphia, Pa. |
| [21] | Appl. No. | 804,288 |
| [22] | Filed | Mar. 4, 1969 |
| [45] | Patented | Dec. 7, 1971 |
| [73] | Assignee | Sybron Corporation |
| | | Rochester, N.Y. |

[54] PROCESS FOR THE HALOALKYLATION OF CROSS-LINKED STYRENE COPOLYMERS
5 Claims, No Drawings

[52] U.S. Cl...................................................... 260/2.1 E,
260/86.7, 260/88.2 C, 260/93.5 A, 260/651 HA
[51] Int. Cl........................................................ C08f 27/02,
C08f 27/08, C08f 19/12
[50] Field of Search............................................ 260/2.1 E,
651 HA, 93.5 A

[56] References Cited
UNITED STATES PATENTS

| 2,694,702 | 11/1954 | Jones............................. | 260/2.1 |
| 2,951,100 | 8/1960 | Adams et al.................. | 260/651 |
| 2,960,480 | 11/1960 | Thielen........................ | 260/2.1 |
| 3,294,850 | 12/1966 | Ayers et al.................... | 260/651 |
| 3,311,602 | 3/1967 | Raley........................... | 260/651 |

Primary Examiner—James A. Seidleck
Attorney—Theodore B. Roessel

ABSTRACT: Haloalkylated aromatic compounds including polymers and copolymers having at least one substitutable nuclear hydrogen per aromatic nucleus are produced by reacting said compounds with an excess of a haloalkylating agent in the presence of a haloalkylating catalyst and zirconium tetrachloride.

3,625,870

PROCESS FOR THE HALOALKYLATION OF CROSS-LINKED STYRENE COPOLYMERS

This invention relates to an improved process for the haloalkylation of compounds containing at least one nuclear hydrogen-containing aromatic group and more particularly relates to the use of zirconium tetrachloride as an additive for promoting haloalkylation. In addition, this invention relates to improved anion exchange resins made by the process of this invention.

BACKGROUND OF THIS INVENTION

Haloalkylation of compounds containing aromatic groups to substitute a haloalkyl group for a nuclear aromatic hydrogen is an important process particularly in the production of anion exchange resins. Typically, haloalkylation is carried out by reacting a haloalkyl ether with the aromatic compound being treated in the presence of a suitable catalyst. This process is well known in the prior art and some of the methods are described in "Organic Reactions," Volume 1, Chapter 3, Page 63 et seq. (1942). In the preparation of anion exchange resins, haloalkylation is also a common step, see U.S. Pat. Nos. 2,591,573; 2,591,574; 2,629,710; 2,788,330 and 2,788,331. In the haloalkylation of aromatic compounds in general and polymers in particular, it is desirable to substitute as many of the nuclear hydrogens as possible with haloalkyl groups since such groups, upon subsequent treatment, will provide the sites for the desired function of the material. Thus, for example, in the production of anion exchange resins, after haloalkylation the resin is aminated to provide strong and weak base sites on the aromatic nuclei of the resin. These sites account for the anion exchange properties of the resin.

Attempts have been made to increase the rate and degree of haloalkylation, such as, for example, U.S. Pat. No. 3,311,602 which teaches the use of silicon tetrachloride, titanium tetrachloride or sulfur trioxide as a catalyst regenerant to aid in the degree of chloromethylation of the aromatic compound. It has been found, however, that this method is not desirable for use in the haloalkylation of resin beads in the production of anion exchange resins because the catalyst regenerants taught in the patent result in undue swelling of the resin bead with a resultant loss of strength in the bead making subsequent treatment thereof substantially impossible.

Accordingly, it is an object of this invention to provide a method for haloalkylation of compounds containing aromatic groups, particularly polymers, where the degree of haloalkylation is substantially improved without deleterious effects on the compound being treated.

It is another object of this invention to provide an improved method for the production of anion exchange resins.

It is another object of this invention to provide an anion exchange resin having substantially improved operating capacity.

SUMMARY OF THE INVENTION

I have discovered that the degree of haloalkylation of a compound having aromatic groups and having nuclear aromatic hydrogens is substantially improved when zirconium tetrachloride is added to the reaction mixture in addition to the conventional catalyst. The zirconium tetrachloride can be used in amounts as low as 0.05 mole of zirconium tetrachloride per mole of haloalkyl group to be substituted on said aromatic group. I have also found that anion exchange resins produced by haloalkylating a suitable resin in the presence of conventional catalyst and zirconium tetrachloride and subsequently aminated have unexpectedly increased operating capacities with substantially no harmful effect on the resin. In carrying out the method of this invention, the haloalkylation is carried out in a conventional manner using conventional equipment, and substantially no change in operating procedure is required in haloalkylating compounds according to this invention.

As used herein, zirconium tetrachloride includes hafnium tetrachloride. As in well known, the properties of zirconium and hafnium are substantially the same and in most cases zirconium compounds will include 2 to 4 percent hafnium. In addition hafnium tetrachloride by itself is an effective additive for use in this invention.

DESCRIPTION OF INVENTION

In carrying out the process of this invention, the material to be haloalkylated is dissolved or slurried with at least equal parts by weight of a haloalkylating agent and preferably with an excess of the agent in order to insure sufficient haloalkyl groups for substantially complete reaction.

A wide range of aromatic group-containing compounds can be treated in accordance with this invention, it being important only that the aromatic nucleus contain hydrogens capable of substitution with the haloalkyl groups in accordance with conventional haloalkylating methods. Thus, for example, the improved process can be employed for haloalkylation of aromatic materials, such as, for example, benzene, napthalene and diphenyl ether as well as alkyl benzenes, such as, toluene, xylene and durene. Other suitable compounds include chlorobenzene, benzylchloride and bromoethylbenzene. In addition, this process may be used to haloalkylate many polymers containing at least one nuclear hydrogen-containing aromatic group, such as, for example, linear polymers of vinyl aromatic monomers including styrene, vinyl toluene, alpha-methylstyrene and vinyl-pyridine as well as copolymers of such vinyl aromatic monomers with other nonaromatic ethylenically unsaturated monomers which are copolymerizable with styrene such as vinyl chloride, acrylonitrile, methyl acrylate and the like. Furthermore, cross-linked aromatic polymers such as styrene-divinylbenzene copolymers, styrene-ethylene glycol dimethacrylate and styrene-trimethylol propane trimethacrylate and the like can be haloalkylated in accordance with this invention. Any standard haloalkylating agent, such as, for example, chloromethyl methyl ether or other alkyl chloromethyl ethers such as chloromethyl ethyl ether may be used. In the examples set forth below, chloromethyl methyl ether is a preferred haloalkylating agent.

In haloalkylating a polymer or copolymer in the form of beads, such as when haloalkylating a polymer bead suitable for the preparation of an anion exchange resin, it is highly preferred to include in the reaction mixture a suitable swelling agent in order to cause the beads to be come slightly porous thereby exposing a portion of the interior of the beads to haloalkylation. The use of swelling agents in the haloalkylation of resin beads is well known in the prior art and does not form a part of this invention. In the examples set forth below, propylene dichloride is used as a swelling agent.

In general, haloalkylation is carried out at a temperature between about 0° C. and 70° C. with a reaction time of from about 0.5 to 8 or more hours. Normally the reaction is run at atmospheric pressure and without a protective atmosphere.

The reaction mixture is normally 50° C. stirred at room temperature for a sufficient time to insure complete mixture of the material being haloalkylated and the haloalkylating agent. It is then cooled to 25° C. prior to the addition of the haloalkylating catalyst. Various haloalkylating catalysts are well known in the prior art and include, for example, aluminum chloride, stannic chloride, or zinc chloride with aluminum chloride being highly preferred. The haloalkylating catalyst is added in proportions well-known in the art, normally between 0.1 to 1.5 moles and is added gradually over a period of 5 minutes to 3 hours. As mentioned above haloalkylation may be carried out between 0° C. to 70° C., preferably at about 60° C. The zirconium tetrachloride can also be added at this time or may be added subsequently as a separate operation. After addition of the haloalkylating agent the reaction mixture is maintained at a temperature between about 0°C. and 70° C. and stirred for sufficient time to complete the haloalkylation of the material being treated. This time period varies inversely with the temperature of reaction. When adding the zirconium tetrachloride subsequent to the addition of the catalyst, it is preferred to allow substantially complete haloalkylation before adding the zirconium tetrachloride. After addition of the zirconium tetrachloride the reaction mixture is stirred at about 60° C. for about an hour, quenched with ice water, and the haloalkylated product recovered. When adding the zirconium tetrachloride and the catalyst simultaneously the reaction mixture is preferably stirred at about 40° C. for about ½ hour.

The proportions of zirconium tetrachloride added to the reaction mixture are not critical except that it has been found that when less than 0.05 moles of zirconium tetrachloride per mole of haloalkyl group to be substituted on the aromatic group is added to the reaction mixture, the effectiveness of the zirconium tetrachloride is minimal. Best results have been achieved when the proportion of zirconium tetrachloride comprises 0.05 to 0.20 moles per mole of haloalkyl group to be substituted and the preferred amount of zirconium tetrachloride is 0.15 moles. An excess of zirconium tetrachloride is not harmful in the reaction, but it has been found that no additional improvement in the finished product is achieved when the proportion of zirconium tetrachloride exceeds about 1.5 moles per mole of haloalkyl group to be substituted.

The effect of the zirconium tetrachloride on the reaction is not understood. In tests run on anion exchange resins, using operating capacity as a measure of the degree of haloalkylation, it has been found that zirconium tetrachloride by itself is slightly superior to aluminum chloride as a catalyst. Furthermore, tests run on anion exchange resins using first an addition of aluminum chloride followed by a later addition of aluminum chloride or by making subsequent additions of zinc chloride or stannic chloride to reaction mixtures catalyzed with aluminum chloride produced anion exchange resins which had operating capacities either lower than or no better than anion exchange resins produced by conventional haloalkylating methods using aluminum chloride as the catalyst.

The following specific examples illustrate more clearly the exact manner in which the process of the present invention can be carried out, although the invention is not to be construed as limited in its scope thereby.

Example I
A. Preparation of Chloromethylated Polymer 200 grams of polymer beads prepared by copolymerizing styrene with 4 percent trimethylol propane trimethacrylate (TMPM), was mixed with 260 grams of chloromethyl methyl ether and stirred for 15 minutes. 700 grams of propylene dichloride was added to the mixture and stirring was continued for an additional 30 minutes. The mixture was then cooled to about 25° C. and 133 grams of $AlCl_3$ was added at intervals over a period of 30 minutes. After the mixture was stirred at 60° C. for 3 hours, 70 grams of $ZrCl_4$ was added. The mixture was then stirred at 60° C. for 1 additional hour, quenched with ice water and filtered to recover the beads.

B. Amination of Chloromethylated Polymer

The chloromethylated polymer beads produced in A above were suspended in 270 ml. of water. 710 grams of 25 percent solution of trimethylamine in water was added and the mixture was stirred at 40° C. for 6 hours. The aminated beads were separated from the mixture and the operating capacity of resulting anion exchange resin was determined by flowing an excess of a solution sodium chloride through a 1 inch diameter column of the beads and titrating the amount of hydroxyl ion liberated. The operating capacity of the anion exchange resin calculated in milliequivalents per milliliter is shown in table I below.

The general procedure of example I was used to examine the effect of various aromatic compounds, catalysts and additives on operating capacity. The results of this examination are presented in table I below.

The method of chloromethylation, amination and determination of operating capacity of the aromatic compounds as well as reaction conditions of examples 2–8 was carried out in the manner set forth in example I above.

Molar quantities of catalyst, additive and other ingredients of example I were used in examples 2–8. The aromatic compounds of examples 1–4 were copolymers of styrene and 4 percent trimethylol propane trimethacrylate (TMPM). The aromatic compounds of examples 5 and 6 were copolymers of styrene and 9 percent ethylene glycol dimethacrylate (EGDM). The aromatic compounds of examples 7 and 8 were copolymers of styrene and 4 percent divinylbenzene (DVB). No additive was used in examples 2 and 7.

TABLE I.—EFFECT OF AROMATIC COMPOUND, CATALYST AND ADDITIVE ON OPERATING CAPACITY

| Example | Aromatic compound | Catalyst | Additive | Operating capacity, meq./ml. |
|---|---|---|---|---|
| 1 | Styrene—4% TMPM | $AlCl_3$ | $ZrCl_4$ | 1.45 |
| 2 | Styrene—4% TMPM | Same | | 1.30 |
| 3 | Styrene—4% TMPM | $ZrCl_4$ | $ZrCl_4$ | 1.38 |
| 4 | Styrene—4% TMPM | $AlCl_3$ | $AlCl_3$ | 1.30 |
| 5 | Styrene—9% EGDM | $AlCl_3$ | | 0.94 |
| 6 | Styrene—9% EGDM | Same | $ZrCl_4$ | 1.20 |
| 7 | Styrene—4% DVB | $AlCl_3$ | | 1.40 |
| 8 | Styrene—4% DVB | Same | $ZrCl_4$ | 1.47 |

The operating capacities for examples 2 and 7 where aluminum chloride was used as catalyst in the absence of any additive, are those normally expected for anion exchange resins produced by the haloalkylation process. When aluminum chloride was used as an additive and a catalyst as in example 4, results similar to aluminum chloride as a catalyst without an additive were obtained. Furthermore, when zirconium tetrachloride was used as a catalyst and an additive, as in example 3, the resulting operating capacity, although superior to the operating capacity of example 4 where aluminum chloride was used, is expected in view of the fact that zirconium chloride is a somewhat superior catalyst in certain haloalkylation reactions. However, in every haloalkylation where zirconium tetrachloride was used as an additive and aluminum chloride was used as the catalyst, there was an unexpected increase in the operating capacity of the anion exchange resin. Thus, examples 1, 6 and 8 indicate that when zirconium tetrachloride was used as an additive in the haloalkylation of aromatic nuclei in the presence of aluminum chloride, a marked and unexpected increase in the operating capacity of the resulting anion exchange resin was produced.

While the invention has been described in connection with specific embodiments thereof, it will be understood that it is capable of further modification, and this application is intended to cover any variations, uses or adaptations of the invention. It will, therefore, be recognized that the invention is not to be considered as limited to the precise embodiments shown and described but is to be interpreted as broadly as permitted by the appended claims.

I claim:

1. In a process for the haloalkylation of cross-linked copolymers obtained by copolymerizing styrene with a material selected from the group consisting of divinylbenzene, ethylene glycol dimethacrylate and trimethylol propane trimethacrylate by reacting said cross-linked copolymers with an excess of a haloalkylating agent in the presence of a haloalkylating catalyst selected from the group consisting of aluminum chloride, zinc chloride and stannic chloride, the improvement which comprises the addition of at least 0.05 mole of zirconium tetrachloride per mole of haloalkyl group to be substituted on the aromatic group of said cross-linked copolymers to the reaction mixture.

2. The process of claim 1 wherein said haloalkylating agent is chloromethyl methyl ether.

3. The process of claim 1 wherein said reaction mixture is agitated and maintained at a temperature of about 0° C. to about 70° C. while adding said zirconium tetrachloride and thereafter said reaction mixture, including said zirconium tetrachloride, is maintained, with agitation at said temperature for a sufficient period to allow for substantial completion of said chloromethylation reaction.

4. The process of claim 1 wherein after the addition of zirconium tetrachloride said reaction mixture is maintained at a temperature of about 60° C. for about 1 hour.

5. The process of claim 1 wherein upon completion of said chloromethylation reaction said chloromethylated reaction product is aminated.

* * * * *

PO-1050
(5/69)

UNITED STATES PATENT OFFICE
CERTIFICATE OF CORRECTION

Patent No. 3,625,870          Dated December 7, 1971

Inventor(s) Amos Norwood

It is certified that error appears in the above-identified patent and that said Letters Patent are hereby corrected as shown below:

In the specification column 2, line 57 delete "50°C.".

Column 4, line 18 in Table I, delete "meq. 1 ml." and substitute therefor --meq./ml.--.

Signed and sealed this 2nd day of May 1972.

(SEAL)
Attest:

EDWARD M. FLETCHER, JR.
Attesting Officer

ROBERT GOTTSCHALK
Commissioner of Patents